July 10, 1928.
A. C. SENGER
1,677,052
TIRE CHANGING APPARATUS
Filed Dec. 10, 1924
3 Sheets-Sheet 2
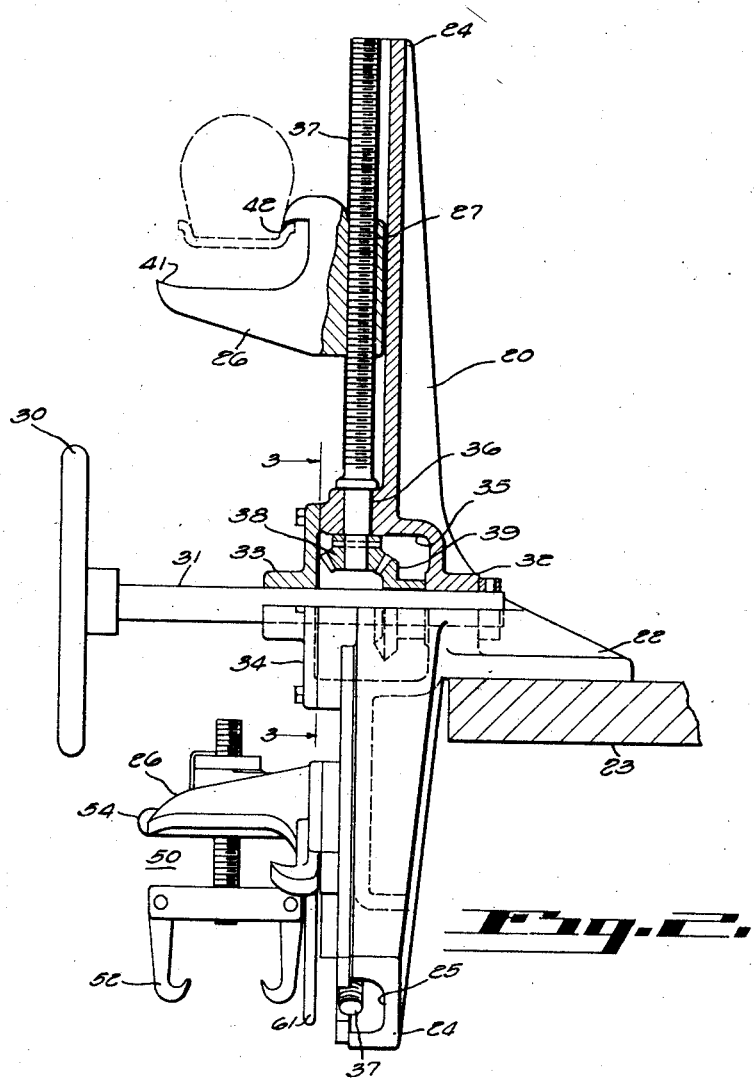
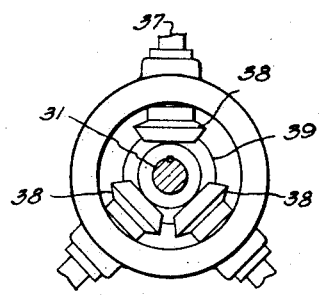
Inventor
Albert C. Senger
By Maréchal + Fehr
Attorneys July 10, 1928.
A. C. SENGER
1,677,052
TIRE CHANGING APPARATUS
Filed Dec. 10, 1924    3 Sheets-Sheet 3
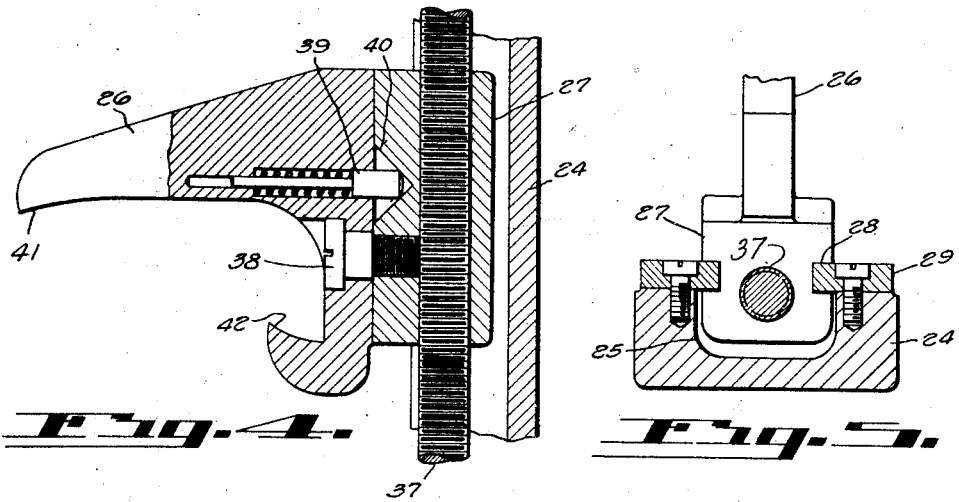
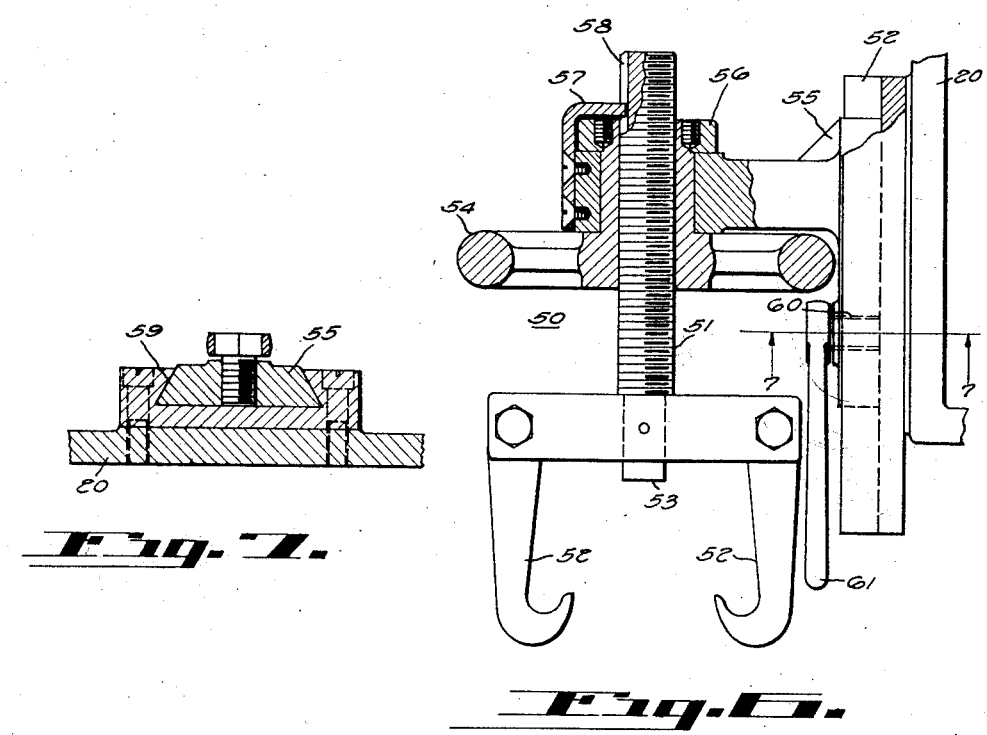
Inventor
Albert C. Senger
By Maréchal + Fehr
Attorneys Patented July 10, 1928.

1,677,052

UNITED STATES PATENT OFFICE.

ALBERT C. SENGER, OF HAMILTON, OHIO.

TIRE-CHANGING APPARATUS.

Application filed December 10, 1924. Serial No. 754,979.

The present invention relates to a machine for facilitating the application or removal of a tire from a rim, and is particularly adapted for use with a rim of the transversely split type.

One of the principal objects of the present invention is to provide such a device which shall be simple, reliable and easy to operate.

Another object of the invention is to provide a device which in its operation will not spring or otherwise injure the rim.

Other objects of the invention will be apparent from the following description taken in connection with the accompanying drawings, in which:

Fig. 2 is a side elevation of the apparatus, parts thereof being broken away, on the line 2—2 of Fig. 1;

Fig. 3 is a view taken on the line 3—3 of Fig. 2;

Fig. 4 is a detail view taken on the section line 4—4 of Fig. 1 certain of the parts being shown in elevation and the rim engaging member being shown in its normal position;

Fig. 5 is a detail view taken on the section line 5—5 of Fig. 1 the rim engaging member being shown in its normal position;

Fig. 6 is a detail view taken on the section line 6—6 of Fig. 1 certain of the parts being shown in elevation to more clearly illustrate the construction; and Fig. 7 is a section taken on the section line 7—7 of Fig. 6.

Figure 1:
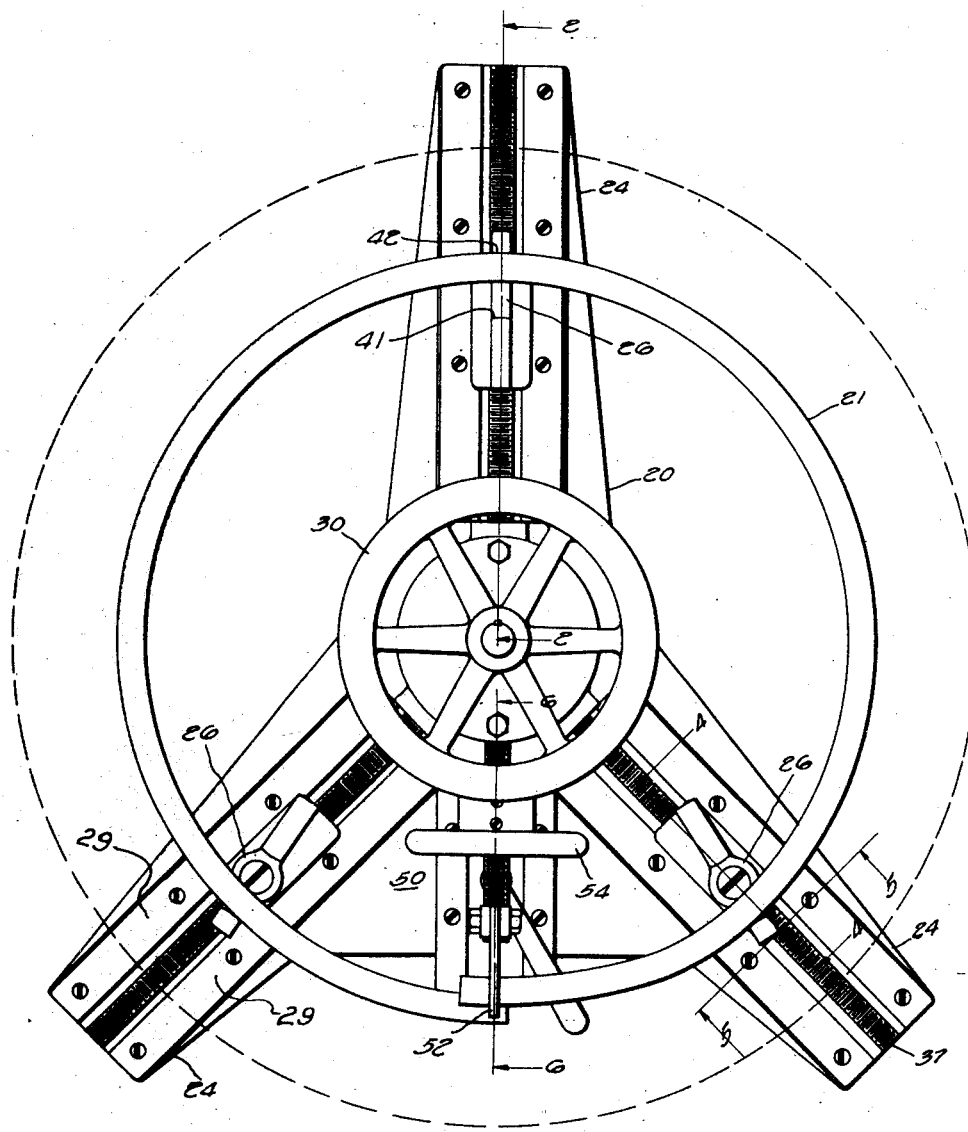
Fig. 1 is a front elevation of the apparatus showing a rim thereon in contracted position.

Referring to the drawings which illustrate a preferred embodiment of the invention, 20 designates generally the supporting member or frame which is adapted to receive and support thereon the split rim 21 and the mechanism for expanding and contracting the rim. As best shown in Fig. 2 the support 20 is disposed in an upright or substantially vertical position, that is, a position in which the split rim is operated on while it is in an upright or substantially vertical position, and the support is provided with a rearwardly extending extension or bracket 22 by which the support or frame 20 may be securely fastened in upright position upon a suitable supporting standard such as a bench 23.

The support 20 is formed with a plurality of radially or outwardly disposed arms or extensions 24, three in number in the present embodiment, each of which is provided on its front face with a channel 25 for receiving therein a rim engaging means or hook jaw 26 and guiding the same for radial inward and outward movement. For facilitating the sliding movement of the rim engaging means the latter are provided with enlarged portions or blocks 27 having therein grooves 28 for receiving the guide strips or bars 29 secured to the front face of the arms 24. The several rim engaging members 26 may be actuated for simultaneous inward and outward movement in their respective guides by means of the hand wheel 30 mounted on the forward end of the horizontal centrally disposed drive shaft 31 which has bearing in the bosses 32 and 33 formed respectively on the main body of the support 20 and on the cover plate 34 of the gear housing 35.

The gear housing 35, as shown in Figs. 1 and 2, is centrally disposed with respect to the arms or extensions 24 and is provided in its circumferential wall with openings 36 which constitute bearings for radially disposed shafts 37. The latter are screw threaded and pass through suitable cooperating screw threaded openings in the lower portions or blocks of the rim engaging means 26 whereby, upon rotation of the shafts 37 the rim engaging means are caused to move radially outwardly or inwardly. Secured to the inner ends of the shafts 37 which project into the gear housing 35 are toothed beveled pinions 38 which cooperate with the toothed bevel gear 39 keyed to the driving shaft 31 as best illustrated in Figs. 2 and 3. The gear housing 35 may be provided with any suitable lubricating means or it may be filled with grease for lubricating the pinions 38, gear 39, and the bearings for the shafts 31 and 37.

Referring to Fig. 1 which shows a split rim contracted by means of the tire changing apparatus, it will be seen that the ends of the split rim are overlapped or telescoped which is a position that the ends naturally take when the rim is drawn inwardly at a number of points about its circumference as by means of the tire engaging means or hook jaws 26. To permit the lower portions of the split rim to freely move towards one another without having the rim scrape and chatter over the two lower rim engaging hooks 26, the latter are formed in two parts, the hook jaw or rim engaging member proper being pivotally mounted on its block portion 27. The pivotal mounting of the rim engaging hook member 26 upon its block 27 is best illustrated in Fig. 4 in which 38 designates the bolt about which the hook member 26 is adapted to pivot. To yieldingly maintain the hook member 26 in its normal radially disposed position the hook member 26 is provided with a spring pressed plunger 39 which cooperates with a conical depression or hole 40 formed in the block 27, the arrangement of the parts being such that when the spring pressed plunger 39 is at the bottom of the depression 40 the hook member 26 is in its normal radially disposed position, and when the hook member swings out of this position the plunger 39 rides up the side wall of the conical depression in such a manner as to compress the spring. The parts are thus placed under tension tending to restore the rim engaging hook 26 to its normal or radial position. While in the present embodiment of the invention two of the rim engaging members are illustrated as pivoted, it will be obvious that the number of such pivoted rim engaging members may be increased or decreased as desired. Each of the rim engaging members 26 is formed as a large forwardly extending jaw which is adapted to be brought into engagement with the inner surface of the rim to expand the same, this jaw having its extreme forward end curved to form a hook 41 for engaging the front edge portion of the rim and preventing the rim from slipping off the jaw. The rim engaging member 26 is also provided with small hooks 42 arranged to engage the rearward edge of the rim for contracting the rim.

Secured to the support 20 between the two lower or pivoted rim engaging members 26 is aligning and disaligning mechanism designated as a whole by reference character 50, for operation upon one or the other of the two ends of the split rim for the purpose of moving said ends into or out of alignment with one another. It may be here stated that in order to collapse a rim to remove the tire therefrom, it is usually found necessary to draw one of the abutting ends of the rim inwardly so as to move the ends out of alignment thereby permitting them to telescope or slide over one another as the pressure is put on the rim to collapse the same. Also, in expanding the rim to engage a tire placed thereabout it is sometimes necessary owing to the fact that one end of the rim has been sprung during use of the rim, to place a pressure upon one of the ends in order to bring the same into alingnment so that the ends can be locked together.

Referring now to Figs. 1, 6 and 7, it will be seen that the mechanism for bringing the ends of the rim into or out of alignment comprises a screw threaded stem 51 carrying on its lower end a pair of drawing-in hooks 52 which are adapted to engage the opposite edges of the rim to draw the same inwardly at certain times, and the lower end 53 of the stem being adapted to abut the inner surface of the rim to force the same outwardly at other times. The stem 51 has screw threaded engagement with and bearing in the hub portion of hand wheel 54 which itself has bearing in the forwardly extending portion of block 55. Secured to the upper end of the hub portion of hand wheel 54 is a collar 56 for retaining the hand wheel 54 against longitudinal movement in its bearing. Rotation of the hand wheel 54 causes longitudinal movement of the screw threaded stem 51 to either draw the rim inwardly through engagement of the hooks 52 or to force the rim outwardly through engagement with the end 53 of the screw threaded stem. To prevent rotation of the screw threaded stem 51 within the hand wheel when the mechanism is not engaged with a rim, the block 55 is provided with an extension or tongue 57 for engagement with a longitudinal groove or slot 58 formed in the stem 51.

In order to quickly and easily adjust the mechanism 50 to operate upon rims of both large and small diameter, and also in view of the limited space available for the mechanism 50 when used with a small size rim, the aligning and disaligning mechanism 50 is made adjustable as a whole upon the support 20. This is accomplished by forming the rearward or enlarged base portion of the block 55 for reception within and in sliding engagement with a vertical radially disposed groove or guide 59 secured to the front face of the support 20. The sliding block 55 and mechanism carried thereon may be moved upwardly or downwardly as desired and locked in position in the guide 59 by means of a suitable locking screw 60 which may be operated by a handle 61.

In the operation of the present invention the support is normally secured to a suitable standard or bench in a substantially vertical position, that is, a position in which the rim is substantially vertical. After the rim has been placed in position on the rim engaging hooks 26 the mechanism 50 may be operated to hold the two ends of the rim out of alignment with one another so that these end portions may be collapsed. The drawing in of one end of the rim is accomplished by operating the hand wheel 54, and, the drawing-in hooks 52 being in engagement with the rim, the end of the rim engaged by these hooks is thereby drawn inwardly and held in inward position. The rim is then collapsed by operating the hand wheel 30 to bring the small hooks 42 of the rim engaging members 26 into engagement with the rim thereby drawing in or collapsing the rim. During this inward or collapsing movement of the rim the end portions of the rim naturally move towards one another in telescoping relationship as best shown in Fig. 1, and this movement is facilitated by the lower swinging or swiveled rim engaging members 26 which swing to the position shown in Fig. 1.

In expanding the rim after the tire has been placed thereabout the hand wheel 30 is operated to move the rim engaging hooks 26 outwardly until the ends of the rim are no longer overlapped. Sometimes it is found that the rim is sprung due to misuse or an unusual pressure while in use upon the vehicle so that the two ends of the rim do not naturally come into alignment with one another. In such an event the mechanism 50 is again brought into operation to press one of the ends of the rim outwardly or to pull the other end inwardly and to hold these ends in alignment until they can be locked together.

From the foregoing it will be apparent that the present invention provides a tire changing machine simple and rugged in construction and which may be set up for operation in a position which enables the easy and quick changing of tires, the rim engaging hooks, operating handles and other parts being constructed and arranged to provide the easy operation and accessibility which contribute to this result. More specifically, an advantage of the present invention is the provision of a vertical support by which rims may be operated upon while in an upright and convenient position. A further advantage resulting from this arrangement is that the mechanism for moving the rim engaging members radially is offset and taken out of the path of the mud and dirt which falls from the tire and rim in varying quantities and which if it falls into the channels 25 is likely to interfere with the proper operation of the machine. Another advantage of this upright arrangement is that the drawing-in hooks 52 naturally fall into position to engage the rim and need not be held in rim engaging position by hand or other special means.

Still another advantage of this invention is to be found in the pivoted mounting for certain of the rim engaging hooks 26. This enables the ends of the rim to move freely towards or away from one another during contraction and expansion of the rim, thereby obviating the necessity of the rim sliding or chattering over the rim engaging hooks 26 while under considerable pressure or, if it fails to slide, possibly resulting in springing or otherwise damaging the rim.

This invention also provides an improved means for moving the ends of the rim into or out of alignment with one another, an important advantage residing in the provision of means for expanding the end portion of the rim as well as drawing it inwardly, a further advantage residing in the arrangement by which this mechanism may be easily and quickly adjusted to rims of both large and small size, and a still further advantage residing in the construction and arrangement of such a mechanism which will permit its operation within the limited space available inside a very small rim such, for example, as one carrying a balloon tire thereon.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a tire changer, a support adapted to receive thereon a transversely split rim, means carried by said support for effecting contraction or expansion of the rim, said means comprising a block guided for movement on said support, means for moving said block inwardly or outwardly, and rim-engaging means for transmitting motion of said block to the rim, said rim-engaging means being pivotally connected with the block to permit movement thereof in a circumferential direction, and yielding means for returning said rim-engaging means to a normal position after such circumferential movement thereof.

2. In a tire changer, a support adapted to receive thereon a transversely split rim, a plurality of rim-engaging members adapted to engage the rim to expand or contact the same, means for simultaneously actuating said members, one or more of said rim-engaging members being constructed and arranged for circumferential movement in conformity with the movement of the rim, and means tending to automatically return said last-mentioned rim-engaging members circumferentially to a predetermined position.

3. In a tire changer adapted to be engaged with a transversely split rim to expand or contract the same, a rim-engaging member to engage a portion of said rim, said rim-engaging member being constructed and arranged to follow circumferential movement of the rim portion engaged thereby, and means for automatically returning said rim-engaging member circumferentially to its original position upon disengagement with the rim.

4. In a tire changer adapted to be engaged with a transversely split rim to expand or contract the same, a rim-engaging member to engage a portion of said rim, a supporting member to which said rim-engaging member is movably connected, said rim-engaging member being adapted to move in a generally circumferential direction to follow circumferential movement of the rim portion engaged thereby, means for actuating said supporting member in a generally radial direction, and means tending to automatically return said rim-engaging member to a predetermined normal position relative to said supporting member.

In testimony whereof I hereto affix my signature.

ALBERT C. SENGER.